United States Patent Office 3,592,848
Patented July 13, 1971

3,592,848
METHOD OF PURIFYING TEREPHTHALIC ACID
George Stewart, Tonawanda, and Leon O. Winstrom, East Aurora, N.Y., and Irwin Frankel, Basking Ridge, N.J., assignors to Allied Chemical Corporation, New York, N.Y.
No Drawing. Continuation-in-part of application Ser. No. 407,518, Oct. 29, 1964. This application May 3, 1968, Ser. No. 726,597
Int. Cl. C07c 51/42
U.S. Cl. 260—525                              10 Claims

ABSTRACT OF THE DISCLOSURE

Terephthalic acid which has been obtained by the liquid phase oxidation of p-bis(lower alkyl) benzenes especially xylene, is purified by heating with at least one aliphatic ketone containing from 3 to 8 carbon atoms in the liquid phase at superatmospheric pressure and at a temperature above the normal boiling point of the mixture whereby a solution of terephthalic acid in the liquid ketone is produced and cooling the solution thus produced to effect crystallization of purified terephthalic acid crystals.

---

This application is a continuation-in-part of our copending application Ser. No. 407,518, filed Oct. 29, 1964.

Terephthalic acid is used in large quantities as the starting material for the preparation of fiber forming linear polyalkylene terephthalates. Recent improvements in the art of preparing the latter, e.g. via direct condensation of ethylene glycol with terephthalic acid, require terephthalic acid of exceptionally high purity.

A number of processes are known for the manufacture of terephthalic acid. One general process, which is of interest commercially because of the relatively low cost and availability of the raw material, involves liquid phase oxidation of p-xylene with an oxygen-containing gas in the presence of a heavy metal oxidation catalyst, such as a cobalt or manganese salt; usually with the assistance of a promoter or initiator such as an aldehyde or a ketone. Processes of this type are disclosed, for example, in U.S. Pats. 2,552,268; 2,788,367; 2,853,514; 2,952,704 and 2,959,613, British Pat. 825,975, and Belgian Pat. 621,323.

Terephthalic acid which is obtained by such processes is contaminated by lower oxidation products such as p-toluic acid and 4-carboxybenzaldehyde, as well as by other by-products or polymerization products thereof and/or residual amounts of the metallic catalysts.

Although some of these crude terephthalic acid contaminants are colored, the major portion including 4-carboxybenzaldehyde are colorless and are referred to in this art as "color-forming impurities" since they are readily degraded to intensely colored substances. Thus, for example, esterification of the contaminated crude with an aliphatic glycol, e.g. ethylene glycol, affords discolored polyalkylene terephthalate of low melting point which is unsuitable for manufacture of fiber.

Additionally the color forming impurities indigenous to the terephthalic acid crude undergo conversion to colored bodies when the crude is dissolved by heating in concentrated sulfuric acid. As noted in U.S. Pat. 3,080,421 this degradation can be visually observed by a darkening of the solutions. (Since solutions of pure terephthalic acid in concentrated sufuric acid are stable and remain substantially colorles even when heated for hours as high as 230° C., there is thus provided a convenient test of purity according to which a terephthalic acid showing little or no darkening in hot concentrated sulfuric acid is indicated as suitable for reaction with ethylene glycol to produce a polymer of excelent color and melting point.)

Owing to the nature of terephthalic acid, the ordinary methods of purification cannot be employed for its recovery from contaminated terephthalic acid in a sufficiently pure form to be useful directly in the manufacture of fibers of the linear polyalkylene terephthalate class. Terephthalic acid is a solid which does not melt and which cannot be distilled; it sublimes from the solid to the vapor phase at about 400° C. It is practically insoluble in water and in the usual organic solvents employed for purification or organic compounds under the conditions normally employed. Thus, only a negligible amount of the aforementioned contaminants, and particularly 4-carboxybenzaldehyde and cobalt acetate, can be removed by conventional washing of the crude acid, e.g. with hot or boiling lower aliphatic alcohols, ketones, carboxylic acids and water. The impurities which are locked within the crystal masses of crude terephthalic acid are not removed.

It is the principal object of the present invention to provide a novel method of purifying terephthalic acid which is free from such disadvantages.

Another object of the present invention is to provide a novel method of purifying terephthalic acid contaminated by impurities of the type present in crude terephthalic acids obtained by the catalytic liquid phase oxidation of p-bis(lower alkyl) benzenes whereby terephthalic acid is obtained which is suitable for the manufacture of polyethylene terephthalate of excellent quality.

A further object of the present invention is to provide a novel method of producing terephthalic acid which forms, at most, light yellow-colored solution in hot concentrated sulfuric acid, and which is adapted to produce polyethylene terephthalate of sufficiently satisfactory color and filamentary properties to render it useful in the manufacture of textile fibers, from crude terephthalic acids resulting from the catalytic liquid phase oxidation of p-xylene in the presence of a cobalt or manganese salt and an aldehyde or ketone promoter.

Other objects of the invention in part will be obvious and in part will appear hereinafter.

According to the present invention, terephthalic acid which is contaminated by impurities of the above type is converted to a form substantially free from such impurities by:

(1) Heating a mixture of the contaminated terephthalic acid with a ketonic solvent of the group consisting of $C_3$ to $C_8$ aliphatic ketones and aqueous mixtures thereof containing up to about 70 weight percent water at a temperature of at least 150° C. and above the normal boiling point of the terephthalic acid-solvent and at a superatmospheric pressure at least sufficient to maintain the solvent in the liquid phase, whereby a liqiud solution of terephthalic acid is produced, (2) Cooling the solution thus produced to effect crystallization of terephthalic acid, and (3) Separating terephthalic acid crystals thus obtained from the ketone solution of impurities.

We have discovered that terephthalic acid can be dissolved in one or more aliphatic $C_3$ to $C_8$ ketones (that is, open-chain and cyclic aliphatic ketones having 3 to 8 carbon atoms in the molecule) and aqueous mixtures thereof containing up to 70 weight percent water by heating it with such solvents at temperatures above the normal boiling points (that is, the boiling points at atmospheric pressure) of the resulting mixtures, but at temperatures of at least 150° C., and at superatmospheric pressures at least sufficient to maintain the ketonic solvent in the liquid phase (for example, in a closed vessel under the superatmosphere pressures resulting from vaporization of the solvent or the superatmospheric pressure resulting from the introduction of a gas non-reactive with the terephthalic acid under the conditions employed, such as nitrogen); and recovered from such solutions in the form of substantially pure crystals by cooling, while the impurities normally present in crude terephthalic acids of the aforesaid type such as p-toluic acid and 4-carboxybenzaldehyde and/or their conversion products resulting from the heating treatment are retained in the ketonic solvent.

The result is surprising, because the ketones and water employed in the practice of the present invention are at best poor solvents for terephthalic acid. They are liquids which even at their boiling points at atmospheric pressure dissolve appreciably no terephthalic acid; they dissolve less than 1% of their weight of terephthalic acid. Moreover the prior art has prescribed against heating such ketones, for example cyclohexanone, even in admixture with water at the elevated temperatures employed in the present process so as to avoid loss of the ketone due to self condensation which occurs at temperatures as low as the normal boiling point of the ketone and is catalyzed by acidic substances. It was also surprising to discover that addition of water to the ketone improved the solubility of the terephthalic acid herein under the conditions of the present process since U.S. Pat. 2,952,704 teaches that addition of water to lower aliphatic ketones lowers the solubility of phthalic acids therein.

It is a feature of the present invention that the impurities of the type referred to above are sufficiently soluble in the ketonic solvents employed to permit repeated use of the ketonic solvents in a cyclic process involving reuse of the solvent in purifying subsequent quantities of cantaminated terephthalic acid. This also permits the purification process of the present invention to be combined with continuous processes for the manufacture of terephthalic acid of high purity from p-xylene and related p-bis(lower alkyl) benzenes as, for example, a process of the type described in Belgian Pat. 621,323, operated on a continuous basis.

In carrying out the purification of crude terephthalic acids contaminated by impurities of the type referred to above and especially of the type resulting from the liquid phase oxidation of p-bis(lower alkyl) benzenes, especially p-xylene, and lower oxidation products thereof, the crude terephthalic acid is heated with one or a mixture of $C_3$ to $C_8$ aliphatic ketones or aqueous mixture thereof in a closed vessel at a temperature of at least 150° C. but below the critical temperature of the solvent, preferably at a temperature of at least 170° C., and at suptratmospheric pressure, conveniently developed by vaporization of the solvent. In the case of ketonic solvents boiling above 150° C. at atmospheric pressure, the mixture of crude terephthalic acid and solvent is heated to a temperature above the normal boiling point of the mixture at atmospheric pressure (that is, the boiling point of the mixture at atmospheric pressure).

Various aliphatic $C_3$ to $C_8$ ketones can be employed in the practice of the present invention, including those which are open-chain (alkyl ketones) and those which are cyclic compounds (cycloaliphatic or alicyclic ketones), for example:

| Ketone: | Boiling point at atmospheric pressure, ° C. |
| --- | --- |
| Acetone | 56 |
| 2-butanone(methylethylketone) | 82 |
| Methylisopropyl ketone | 92 |
| Cyclopentanone | 131 |
| 2-methylcyclopentanone | 139 |
| 4-heptanone | 144 |
| 3-heptanone | 148 |
| Cyclohexanone | 156 |
| 2-methylcyclohexanone | 166 |
| 2,2-dimethylcyclohexanone | 170 |
| 2-octanone | 173 |
| 2,6-dimethylcyclohexanone | 174 |
| Cycloheptanone | 182 |
| Cyclooctanone | 202 |

Preferred ketones for use in the practice of the present inveniton are the cycloaliphatic ketones containing 5 to 6 ring carbon atoms, and especially cyclohexanone.

If desired an anhydrous ketone or mixture of ketones is employed as solvent. However, mixtures of ketones and water containing up to about 70 weight percent, advantageously up to about 50 weight percent water can be charged as solvent. Charging water to the ketone solvent is highly advantageous in improving the solubility of the terephthalic acid in the solvent at a given temperature, for example, at 190° C. a liquid water-cyclohexanone mixture containing 50 weight percent water dissolves about 12 times more terephthalic acid than does liquid anhydrous cyclohexanone.

However, the use of aqueous ketonic solvents entails a small but significant loss, ca. 1 to 10 weight percent, of the ketone due to self condensation of the ketone, e.g. under the conditions of elevated temperature and pressure prescribed by the invention. These condensation products, however, remain dissolved in the aqueous ketonic solvent on cooling and being retained in the crystallization mother liquor do not contaminate the recovered terephthalic acid to any important degree.

The amount of ketonic solvent employed in the practice of the present invention will vary with the individual ketone and the conditions employed. Since the process is essentially a dissolution of the crude terephthalic acid in the liquid ketonic solvent under sufficiently elevated temperature and pressure conditions to maintain the solvent in the liquid phase, followed by a crystallization of pure terephthalic acid from the solvent, at least sufficient solvent is employed to accomplish dissolution of the terephthalic acid without necessitating the use of extremely high temperatures and pressures. About 1 to 30 parts or more preferably, about 2 to 25 parts and especially about 3 to 20 parts of ketonic solvent per part by weight of crude terephthalic acid are employed in the practice of the invention.

Preferred temperatures range from about 170° to about 300° C. at superatmospheric pressures of about 100 to about 400 p.s.i.g. Although temperatures above 325° C. and pressures in excess of 400 p.s.i.g. can be used, they add unnecessarily to the cost of the apparatus and power required.

Preferably, the crystallization process of the present invention is carried out in an inert atmosphere (that is, an atmosphere non-reactive with terephthalic acid under the conditions employed), such as nitrogen, to avoid possible adverse oxidation by air under the elevated temperature and pressure conditions. If desired, the pressure can be increased by maintaining said gas under pressure greater than the autogenous pressure developed.

The period of time during which mixture is maintained at said temperature and pressure also will vary. The mixture is maintained at least for a sufficient period of time to assure dissolution of most if not all of the terephthalic acid in the hot liquid ketonic solvent. Thus, under the preferred conditions set out above, the mixture is heated for a period from at least a quarter hour to about 2 hours.

At the conclusion of the heating period, the mixture is cooled to cause crystallization of the terephthalic acid from the ketonic solvent. In general, the mixture is cooled to a temperature between the ambient temperature and 150° C. (or below the normal boiling point of the ketonic solvent, in the case of ketonic solvents boiling below 150° C.) to retain the ketonic solvent in the liquid phase when the mixture is returned to atmospheric pressure. Preferably, the mixture is cooled to between 50° and 150° C. (or below the normal boiling point of ketonic solvents boiling below 150° C.).

Cooling can be carried out in any desirable way, e.g., under elevated pressure, with or without intermittent release of pressure during cooling. Or it can be carried out advantageously by continuously passing a stream of the hot solution to a vessel at atmospheric pressure, thereby effecting rapid and total release of pressure ("flashing"). Cooling is advantageously effected at a rapid rate, for example, at the rate of less than 10° C., preferably at about 4° to 5° C., per minute.

A particularly advantageous purification of terephthalic acid is achieved according to the present invention by heating the crude terephthalic acid with about 20 times its weight of cyclohexanone-containing solvent in a closed vessel at a temperature of about 250° C. and a pressure of about 150 p.s.i.g. for about a half hour, then cooling to a temperature of 110° to 150° C. to crystallize the terephthalic acid, followed by separation of the crystallized terephthalic acid from the cyclohexanone solution of impurities.

The precipitated terephthalic acid is recovered by conventional means, e.g. filtration, decantation, centrifugation, etc. It is advantageously separated from the ketonic solution of impurities by filtration, and the last traces of mother liquor are removed from the filter cake of purified terephthalic acid by washing them at ambient temperature, for example, with a suitable solvent, which may be a solvent miscible with the ketonic solvent (such as, the ketone itself, another ketone, an alcohol or an ether) or a liquid having a boiling point below 150° or having appreciable solubility in water, or both of said properties. Removal of the residual traces of the latter solvent can be accomplished by drying the purified terephthalic acid at moderate temperatures, preferably under sub-atmospheric pressure, or advantageously by triturating the terephthalic acid crystals with water, recovering the crystals separate from the wash water, and drying the recovered terephthalic acid crystals with hot air.

No special equipment is required for carrying out the process of the invention. A conventional pressure reaction vessel, advantageously equipped with an efficient agitator and heating and cooling means, constitutes a suitable apparatus.

The purification process of the present invention can be utilized in purifying terephthalic acid obtained in various ways, a number of which are known. It is advantageously employed in removing organic oxidation products and residual catalysts present in crude terephthalic acids obtained by liquid phase oxidation of p-bis(lower alkyl) benzenes, that is benzene substituted by alkyl groups of 1 to 4 carbon atoms. It is especially useful in the purification of terephthalic acid contaminated by impurities that cause formation of dark colored solutions when said terephthalic acid is dissolved in concentrated sulfuric acid at about 230° C., and especially terephthalic acid which is contaminated by 4-carboxybenzaldehyde and which has been obtained by the liquid phase oxidation of p-xylene in a lower alkanoic acid reaction medium in the presence of a metallic catalyst and an aliphatic oxo compound (aldehyde or ketone) as an activator. Thus, the process is of particular utility in the purification of crude terephthalic acids obtained by processes of the type disclosed in the patents referred to above, and especially the processes of U.S. Pat. 2,853,514 and Belgian Pat. 621,323 and similar processes.

The process of the present invention effects a marked increase in the purity of the crude terephthalic acids. Thus, a crude terephthalic acid which forms a very dark colored solution when heated with concentrated sulfuric acid at about 230° C. can be purified in accordance with the present invention to provide a terephthalic acid which, when similarly treated with concentrated sulfuric acid, forms a solution colored only a pale yellow, and which when polymerized with ethylene glycol provides substantially colorless polyethylene terephthalate of high quality and suitable for use as a textile fiber.

If it is desired to effect a more complete purification of the terephthalic acid, this can be accomplished in accordance with the present invention merely by repeating the crystallization process of the invention. In this way it is possible to produce a terephthalic acid of such purity that only a very pale yellow solution is formed upon treatment with concentrated sulfuric acid as above.

In the case of terephthalic acid contaminated by substantial amounts of 4-carboxybenzaldehyde, it is possible in accordance with the present invention to remove 90 weight percent or more of the 4-carboxybenzaldehyde from the terephthalic acid.

The following examples describe specific embodiments of our invention and illustrate the best method contemplated for carrying it out; but they are not to be interpreted as limiting the invention to all details thereof, since changes can be made without departing from the scope or spirit of the invention. Parts and percentages are by weight and temperatures are in degrees centigrade.

EXAMPLE 1

Crude terephthalic acid (250 parts, dry weight), containing 97% of terephthalic acid, 1.96% of 4-carboxybenzaldehyde and about 100 parts per million of cobalt, and which had been obtained by liquid phase air oxidation of p-xylene in acetic acid containing cobalt acetate and acetaldehyde, followed by washing of the resulting terephthalic acid with glacial acetic acid at 95° and water at 95°, was charged to a stainless steel autoclave. Cylcohexanone (2875) parts) was added, the autoclave was closed, nitrogen was introduced to displace the air over the mixture, and the mixture was heated to 250° with efficient agitation, the pressure rising to 150 p.s.i.g. The resulting solution was maintained at 250° for a half hour. The mass was then cooled to 110° over a half hour period, with accompanying fall in pressure, and the resulting slurry was filtered at 110°. The filter cake of terephthalic acid was washed with 1000 parts of cyclohexanone and then slurried with 3000 parts of water at 25° for 15 minutes. The terephthalic acid was recovered by filtration, washed with 1000 parts of water at 25° and dried at 95° in vacuo. The resulting terephthalic acid, which was recovered in substantially quantitive yield, contained 0.03% of 4-carboxybenzaldehyde and 12 p.p.m. of cobalt. When reacted with ethylene glycol, a substantially colorless polyethylene terephthalate forming fibers of good quality was produced.

EXAMPLE 2

The purified terephthalic acid (250 parts) obtained in Example 1 was again subjected to the process of Example 1. The resulting terephthalic acid contained 0.005% of 4-carboxybenzaldehyde and 6 p.p.m. of cobalt. When reacted with ethylene glycol, polyethylene terephthalate was obtained having even less color than that of Example 1 and producing fibers of excellent quality.

A sample of each of the crude terephthalic acid used as starting material in above Example 1 and the purified products of Examples 1 and 2 was tested for purity according to the following procedure: The sample of terephthalic acid (1 part) was added to concentrated sulfuric acid (9 parts of 95.5–96.5% sulfuric acid); the mixture was heated to 235° and the color of the resulting solution was observed.

The results of these tests are listed in Table I.

TABLE I

| Sample: | Color of 10% solution in concentrated sulfuric acid |
|---|---|
| Crude terephthalic acid | Black. |
| Purified terephthalic acid of Example 1 | Pale yellow. |
| Purified terephthalic acid of Example 2 | Very pale yellow. |

The following Examples 3 and 4 illustrate the use of an aqueous ketonic crystallization solvent in the process of the present invention.

EXAMPLE 3

Part A

The procedure of Example 1 was repeated substantially as described except that 250 parts of another crude terephthalic acid which had been similarly obtained, but which contained 1.31% of 4-carboxybenzaldehyde, was dissolved in 3000 parts of cyclohexanone containing 8% of water by heating at a temperature of 200° and a pressure of 150 p.s.i.g.; the terephthalic acid was precipitated by cooling the mass to 60°; and the purified terephthalic acid was recovered by filtration and was washed with 1000 parts of cyclohexanone. The resulting product was divided into two equal portions.

Part B

One portion was treated with hot water and dried substantially as described in Example 1. The resulting purified terephthalic acid contained 0.12% of 4-carboxybenzaldehyde.

Part C

The other portion was again subjected to the crystallization process of Part A of this example, employing cyclohexanone containing 8% water. The resulting terephthalic acid contained 0.056% of 4-carboxybenzaldehyde.

EXAMPLE 4

A mixture of crude terephthalic acid of the type employed in Example 1 but containing 1.33% of 4-carboxybenzaldehyde, 400 parts of cyclohexanone and 400 parts of water was heated over a period of one hour to a temperature of 165° and an autogenous pressure of 100 p.s.i.g. substantially as described in Example 1. The mass was agitated at the aforementioned conditions of temperature and pressure for two hours, cooled under pressure to about 40° over a period of two hours and filtered at ambient pressure at about 30°. The filtrate obtained contained about 4.71 percent dissolved cyclohexanone self condensation product.

The solid collected in the filtration was washed free of adhering solvent with 1500 parts of water at 95° and dried for 4 hours substantially as described in Example 1. There was thus obtained an excellent yield of terephthalic acid containing only 0.14% 4-carboxybenzaldehyde and otherwise of substantially similar quality to the product of Example 1.

EXAMPLE 5

A crude terephthalic acid (250 parts) of the type employed in Example 1, but containing 1.3% 4-carboxybenzaldehyde, was subjected to the crystallization process of Example 1, employing 4750 parts (instead of 2875 parts) of cyclohexanone. The 4-carboxybenzaldehyde content of the terephthalic acid obtained was 0.008%.

EXAMPLE 6

The product of above Example 4 was again subjected to the process of Example 4. The yield of purified terephthalic acid obtained was 242 parts, which corresponds to 96.77% of theory based on the crude terephthalic acid employed in Example 5. The 4-carboxybenzaldehyde content of the resulting purified terephthalic acid was 0.004%.

EXAMPLE 7

For purposes of comparison, 250 parts of crude terephthalic acid of the type employed in Example 1 (but containing 1.3% of 4-carboxybenzaldehyde) was slurried with 2875 parts of cyclohexanone and the slurry was refluxed at atmospheric pressure for 4 hours, then cooled to 60° and filtered. The recovered terephthalic acid was washed with cyclohexanone, then further treated and dried, as described in Example 1. It contained 1.11% of 4-carboxybenzaldehyde.

EXAMPLE 8

About 2 parts of crude terephthalic acid (similar to that charged in Example 1 of the application but containing 1.3% 4-carboxybenzaldehyde) is dissolved in 60 parts of methyl isopropylketone by heating at 245° under an autogenous pressure of 210 p.s.i.g. substantially in accordance with the procedure of Example 1. The resultant solution is cooled to crystallize terephthalic acid which is recovered, washed, and dried as in Example 1. There is obtained an excellent yield of terephthalic acid similar in purity to the product of Example 1.

We claim:
1. A method of purifying terephthalic acid which has been obtained by the liquid phase oxidation of a p-bis (lower alkyl) benzene with a molecular oxygen containing gas and which is contaminated by impurities that cause formation of off-color polyethylene terephthalate of inferior quality when the terephthalic acid is reacted with ethylene glycol which comprises the steps of:
   (1) heating a mixture of the contaminated terephthalic acid with a solvent comprising at least one aliphatic $C_3$ to $C_8$ ketone in the liquid phase at a temperature of at least 150° C. and above the normal boiling point of said mixture, and at a superatmospheric pressure at least sufficient to maintain the ketone in the liquid phase, whereby a solution of terephthalic acid in the liquid ketone is produced,
   (2) cooling the solution thus produced to effect crystallization of terephthalic acid, and
   (3) separating terephthalic acid crystals thus obtained from the remaining ketonic solution of impurities.

2. The process of claim 1 wherein the temperature and pressure in step 1 are at least 170° C. and at least 100 p.s.i.g., respectively.

3. The process of claim 1 wherein the p-bis(lower alkyl) benzene is p-xylene.

4. The process of claim 1 wherein the solvent contains up to 70% water by weight of the ketone.

5. The process of claim 1 wherein the ketone is a cycloaliphatic ketone having 5 to 6 ring carbon atoms.

6. The process of claim 5 wherein the ketone is cyclohexanone.

7. The process of claim 1 wherein the amount of solvent is about 1 to about 30 parts by weight per part of terephthalic acid.

8. A method of purifying terephthalic acid which is contaminated by 4-carboxybenzaldehyde and metallic impurities and which has been obtained by the liquid phase oxidation of a p-bis(lower alkyl) benzene with a molecular oxygen containing gas in a lower alkanoic acid reaction medium in the presence of a metallic catalyst and an aliphatic oxo compound activator which comprises:
   (1) heating a mixture of the said terephthalic acid with a solvent comprising a cycloaliphatic ketone having 5 to 6 ring carbon atoms and a maximum of 8 carbon atoms in the liquid phase at a temperature of at least 200° C. and a pressure of at least 100 p.s.i.g. for a sufficient period of time to form a solution of terephthalic acid in the liquid ketone,
   (2) rapidly cooling the solution thus produced to a temperature below 150° C. to effect crystallization of terephthalic acid, and
   (3) separating terephthalic acid crystals thus obtained from the remaining ketonic solution of impurities.

9. The process of claim 8 wherein the terephthalic acid contains cobalt impurities and has been obtained by oxidation of p-xylene, and the ketone is cyclohexanone.

10. The process of claim 9 wherein the terephthalic acid is heated with about 2 to about 25 times its weight of cyclohexanone at a temperature within the range 200° to 300° C. and a pressure of 100 to 200 p.s.i.g. for a quarter to one hour, and the resulting solution is cooled at the rate of at least 10° C. per minute.

References Cited

UNITED STATES PATENTS

| | | | |
|---|---|---|---|
| 2,840,604 | 6/1958 | Feighner et al. | 260—525 |
| 2,857,429 | 10/1958 | Bruson et al. | 260—525 |
| 3,171,856 | 3/1965 | Kurtz | 260—525 |
| 3,364,256 | 1/1968 | Ichikawa et al. | 260—525 |

LEWIS GOTTS, Primary Examiner

R. S. WEISSBERG, Assistant Examiner